United States Patent
Lewis et al.

(10) Patent No.: US 10,947,859 B2
(45) Date of Patent: Mar. 16, 2021

(54) CLEARANCE CONTROL ARRANGEMENT

(71) Applicant: ROLLS-ROYCE plc, London (GB)

(72) Inventors: Leo V. Lewis, Kenilworth (GB); Vinod Gopalkrishna, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/995,779

(22) Filed: Jun. 1, 2018

(65) Prior Publication Data

US 2018/0347392 A1    Dec. 6, 2018

(30) Foreign Application Priority Data

Jun. 1, 2017 (GB) ..................... 1708746

(51) Int. Cl.
| | | |
|---|---|---|
| *F01D 11/24* | (2006.01) | |
| *F01D 25/24* | (2006.01) | |
| *F01D 11/10* | (2006.01) | |
| *F01D 11/00* | (2006.01) | |
| *F01D 11/02* | (2006.01) | |

(52) U.S. Cl.
CPC ............ *F01D 11/24* (2013.01); *F01D 11/005* (2013.01); *F01D 11/025* (2013.01); *F01D 11/10* (2013.01); *F01D 25/246* (2013.01); *F05D 2220/32* (2013.01); *F05D 2240/11* (2013.01); *F05D 2260/201* (2013.01); *F05D 2260/231* (2013.01)

(58) Field of Classification Search
CPC ......... F01D 11/025; F01D 11/24; F04D 29/58
See application file for complete search history.

(56) References Cited

U.S. PATENT DOCUMENTS

| 8,721,257 | B2* | 5/2014 | Lewis | .................... F01D 11/24 |
| | | | | 415/1 |
| 9,080,463 | B2* | 7/2015 | Denece | .................... F01D 9/04 |
| 2003/0031557 | A1* | 2/2003 | Arilla | .................... F01D 25/246 |
| | | | | 415/173.1 |
| 2011/0229306 | A1 | 9/2011 | Lewis et al. | |
| 2013/0017060 | A1* | 1/2013 | Boswell | .................... F01D 11/24 |
| | | | | 415/1 |
| 2016/0169026 | A1* | 6/2016 | Jones | .................... F01D 11/24 |
| | | | | 415/1 |

FOREIGN PATENT DOCUMENTS

| EP | 2960440 | 12/2015 |
| EP | 3040518 | 7/2016 |
| EP | 3040519 | 7/2016 |

OTHER PUBLICATIONS

Great Britain Search Report dated Oct. 24, 2017, issued in GB Patent Application No. 1708746.1.

* cited by examiner

*Primary Examiner* — Justin D Seabe
*Assistant Examiner* — Michael L Sehn
(74) *Attorney, Agent, or Firm* — Oliff PLC

(57) ABSTRACT

A clearance control arrangement (26) for a rotor (28) comprising a segment assembly (33) spaced radially inwards from a casing (32) and defining a radial clearance (42) between the rotor (28) and the segment assembly (33). A front carrier (35a) and a rear carrier (35b) supporting the segment assembly (33). A heat transfer cavity (48) formed between the carriers (35a, 35b), the segment assembly (33) and the casing (32). A settling chamber (60) formed adjacent to the casing (32) and upstream of the heat transfer cavity (48). The clearance control arrangement (26) is configured to receive air into the settling chamber (60) and thence to deliver it to the heat transfer cavity (48).

16 Claims, 2 Drawing Sheets

CLEARANCE CONTROL ARRANGEMENT

CROSS-REFERENCE TO RELATED APPLICATIONS

This application is based upon and claims the benefit of priority from British Patent Application No. GB 1708746.1, filed on 1 Jun. 2017, the entire contents of which are incorporated by reference.

BACKGROUND

Technical Field

The present disclosure concerns a clearance control arrangement. It finds utility for a rotor stage of a gas turbine engine.

Description of the Related Art

A gas turbine engine rotor stage typically has a rotor with a casing radially outside it. Mounted radially inside the casing is an array of segments. There is a small clearance between the segments and the tips of the rotor blades. Cooling air may be directed into the segment assemblies and directed towards the rotor blades to cool the segment. Cool air may also be impinged on the outside of the casing to change the rate at which it expands or contracts thermally to maintain the clearance at a preferred level.

The clearance control arrangement disclosed herein seeks to improve the control of the tip clearance.

SUMMARY

According to a first aspect there is provided a clearance control arrangement for a rotor, the arrangement comprising: a rotor; a casing radially outside the rotor; a segment assembly spaced radially inwards from the casing and defining a radial clearance between the rotor and the segment assembly; a front carrier and a rear carrier, the segment assembly supported by the carriers; a heat transfer cavity formed between the carriers, the segment assembly and the casing; and a settling chamber formed adjacent to the casing and upstream of the heat transfer cavity, wherein the clearance control arrangement is configured to receive air into the settling chamber and thence to deliver it to the heat transfer cavity.

Advantageously the settling chamber conditions the air to be delivered into the heat transfer cavity. Consequently the heat transfer to the casing is better controlled.

The settling chamber may have an axial length to reduce turbulence in the air passing through it to below a threshold level. The axial length may be greater than or equal to half the axial distance between the front and rear segment carriers. The axial length may be less than or equal to twice the axial distance between the front and rear segment carriers. Advantageously the settling chamber will be axially long enough to generate low intensity flow into and through the heat transfer cavity. Advantageously the settling chamber does not extend significantly forwards of the segment assembly and so does not interfere with upstream components.

The settling chamber may be formed between the front segment carrier, the casing, an upstream wall and an inner wall. The upstream wall may be intermittent in the circumferential direction. The upstream wall may include a slot in the circumferential direction. The upstream wall may include an annular slot. The upstream wall may include an annular array of slots or holes in the circumferential direction. Advantageously a predetermined, metered flow of air is received into the settling chamber.

A birdmouth seal may be defined at the radially outer extent of the rear segment carrier. Advantageously the birdmouth seal acts to limit leakage from the heat transfer cavity to areas downstream of the segment assembly.

The arrangement may further comprise a segment cooling cavity adjacent to the rotor. The heat transfer cavity and the segment cooling cavity may be radially separated by a plate. Advantageously the air flow required for the rotor may be isolated from the air passed through the heat transfer cavity. The plate may comprise impingement holes. Advantageously some air may be introduced from the segment cooling cavity into the heat transfer cavity in a controlled manner. The arrangement may further comprise a delivery hole or pipe which is arranged to deliver air from the heat transfer cavity into the segment cooling cavity. Advantageously flow through the heat transfer cavity is thereby maintained.

The segment assembly may include cooling air delivery holes through its radially inner wall. Advantageously these and the heat transfer cavity may be independently supplied with air.

The rotor may be a turbine rotor.

According to a second aspect there is provided a gas turbine engine comprising a clearance control arrangement as described above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
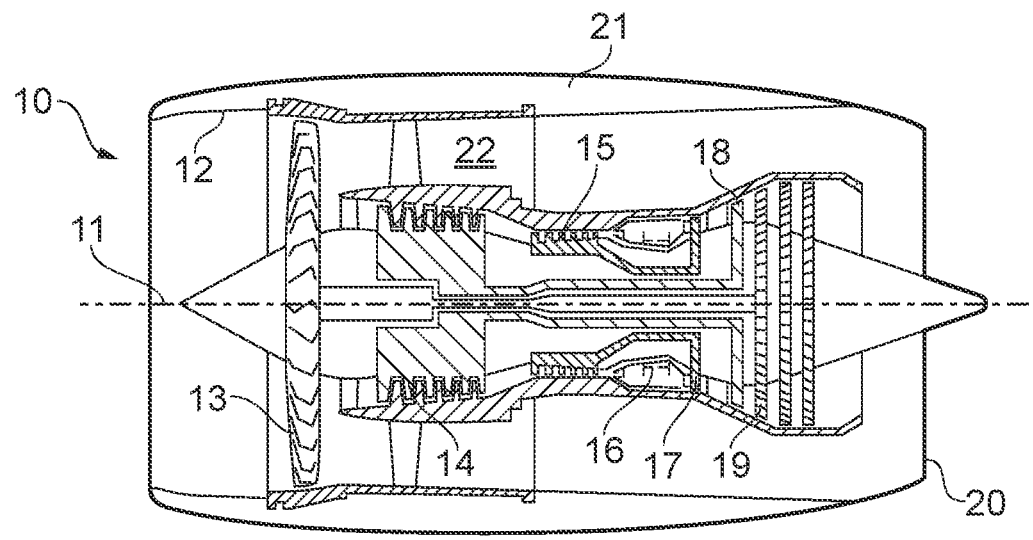
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high pressure turbine 17, an intermediate pressure turbine 18, a low pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low pressure turbines 17, 18, 19 before being exhausted through the nozzle 20 to provide additional propulsive thrust. The high, intermediate and low pressure turbines 17, 18, 19 drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Used herein the term "turbulence" refers to flow in a cavity which generates high heat transfer to the wall of the cavity. It may be characterised by high overall velocity, non-uniformly spread velocity and/or significant recirculation or localised flow effects. Conversely "low intensity flow" refers to flow in a cavity which generates low heat transfer to the walls of the cavity. It may be characterised by reduced overall velocity, uniformly spread velocity across the height of a passage and/or minimised recirculation and localised flow enhancements.

Figure 2:
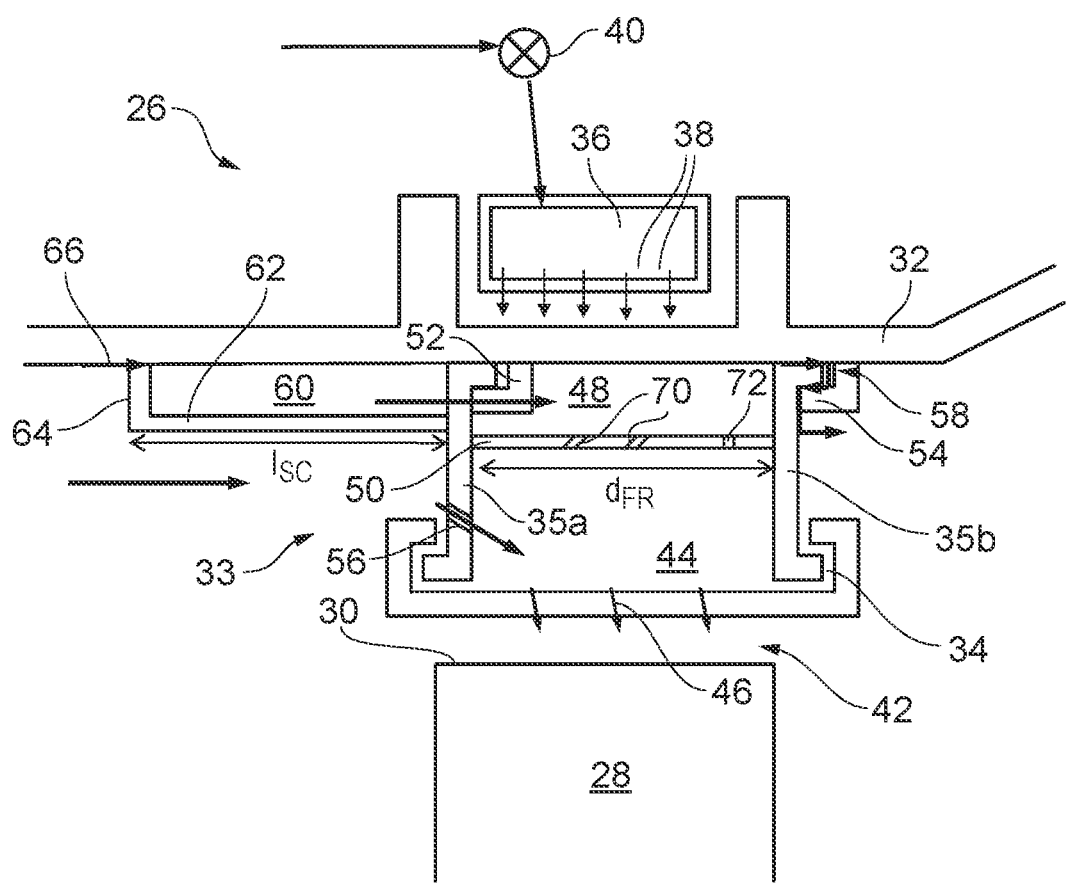
FIG. 2 is a schematic cross-section of a clearance control arrangement.

FIG. 2 is a cross-section of a clearance control arrangement 26. The clearance control arrangement 26 includes a rotor blade 28 which is one of an annular array of rotor blades 28. The rotor blades 28 may form any one of the rotor stages of the intermediate pressure compressor 14, high pressure compressor 15, high pressure turbine 17, intermediate pressure turbine 18 or low pressure turbine 19. Each rotor blade 28 includes a tip 30 at its radially outer end. The tip 30 may be parallel to the engine axis 11 or may be angled, curved or another more complex shape as known to the skilled reader. The tip 30 may include fences, shrouds or other features.

The clearance control arrangement 26 also includes a casing 32 which is annular and is arranged radially outside the rotor blades 28. The casing 32 may extend axially parallel to the engine axis 11 or may have a conical shape or other more complex shape. Typically the shape of the casing 32 radially outside the rotor blades 28 approximately matches the shape inscribed by the rotor blade tips 30.

A plurality of segments 34 are mounted radially inside the casing 32. The segments 34 form an annular array. There may be the same number of segments 34 as there are rotor blades 28, or there may be more segments 34 or fewer segments 34. Each segment 34 extends circumferentially so that the radially inner surfaces of all the segments 34 form a substantially continuous fluid-washed surface over which working fluid of the gas turbine engine 10 flows as it passes between and over the tips 30 of the rotor blades 28.

The segments 34 are each mounted to a segment carrier, particularly a front carrier 35a and a rear carrier 35b where front and rear are relative to the general direction of airflow through the engine 10 in use. The segment 34 and segment carrier together are referred to as the segment assembly 33.

Radially outside the casing 32 there may be one or more cool air chambers 36 having an array of cooling holes 38 through its radially inner surface. The cool air chamber 36 is selectively filled with cool air, for example by opening or closing a valve 40. The cool air is delivered from the cool air chamber 36 through the cooling holes 38 to impinge against the casing 32 in the axial vicinity of the rotor blades 28. The cool air acts to retard the thermal growth of the casing 32 and therefore causes the radial clearance 42 between the rotor tips 30 and the segments 34 to be held small.

Each segment assembly 33 includes at least two cavities or chambers. At the radially inner extent of the segment assembly 33 may be a segment cooling cavity 44. The segment cooling cavity 44 includes cooling air delivery holes 46 through its radially inner wall, which is formed by the segment 34. The holes 46 form an array arranged in any suitable pattern in order to cool the segment 34. They may also form vortices or other fluid forms to aerodynamically reduce the clearance 42 perceived by the working fluid.

The segment assembly 33 includes a front hook 52 and a rear hook 54. The front hook 52 is configured to support the front segment carrier 35a whilst the rear hook 54 is configured to support the rear segment carrier 35b. The front hook 52 may be a fully annular ring or may be intermittent in the circumferential direction. The rear hook 54 is a fully annular ring.

Air may be supplied to the segment cooling cavity 44 via a supply hole or array of supply holes 56 through the front segment carrier 35a. The or each supply hole 56 may be angled towards the segment 34 or may be parallel with the engine axis 11.

Each segment assembly 33 also includes a heat transfer cavity 48 at the radially outer extent of the segment assembly 33, radially proximal the casing 32. Thus the segment cooling cavity 44 does not fill the whole of the interior of the segment assembly 33 but is restricted to the radially inner part thereof. The inner extent of the heat transfer cavity 48 may be defined by a plate 50. The outer extent is defined by the casing 32. The upstream extent is defined by the front segment carrier 35a and front hook 52. The downstream extent is defined by the rear segment carrier 35b and rear hook 54. There is a birdmouth seal 58 at the rear of the heat transfer cavity 48. The birdmouth seal 58 may be formed between the radially outer end of the rear segment carrier 35b and the casing 32. Alternatively it may be formed between an axially extending portion of the rear hook 54 and the rear segment carrier 35b. Alternatively the birdmouth seal 58 may be between a different portion of the rear hook 54 and the rear segment carrier 35b or a sealing element may be inserted into the birdmouth configuration. Air from the heat transfer cavity 48 leaks through the birdmouth seal 58 to an area axially downstream of the segment assembly 33. The leakage through the birdmouth seal 58 is governed by the pressure differential across it, which is generally large. This means that the mass flow pulled from the heat transfer cavity 48 across the birdmouth seal 58 to the downstream area is large and may become the governing factor for the amount of air supplied to the heat transfer cavity 48 in known segment assemblies 33.

Upstream of the heat transfer cavity 48 is a settling chamber 60. The radially outer extent of the settling chamber 60 is defined by the casing 32. The radially inner extent is defined by an inner wall 62. The rear extent is defined by the intermittent front segment carrier 35a and may be partially defined by the intermittent front hook 52. The front extent is defined by an upstream wall 64.

The heat transfer cavity 48 is supplied with air from the settling chamber 60 through the intermittent gaps in the front hook 52. Advantageously the turbulence in the heat transfer cavity 48 is minimised because it is a small cavity with only a single air source, and because the air has been conditioned by the settling chamber 60. Consequently the heat flux from the heat transfer cavity 48 into the casing 32 is reduced. The heat transfer cavity 48 may be longer axially than it is radially deep.

The settling chamber 60 receives relatively hot air via the upstream wall 64, as indicated by arrow 66. The upstream wall 64 may include a continuous annular slot, may be intermittent in the circumferential direction, may include a discontinuous slot or annular array of holes, or may include a flexible seal. The air may be received through the radially outer portion of the upstream wall 64 or may be received through any of its radial extent. The amount of air drawn into the settling chamber 60 is governed by the birdmouth seal 58 at the downstream edge of the heat transfer cavity 48. Thus the upstream wall 64 is designed so that it does not significantly affect the mass flow into and through the settling chamber 60. For example the pressure drop across the upstream wall 64 may be one to two orders of magnitude smaller than the pressure drop across the birdmouth seal 58.

Optionally there may be a heat exchanger or similar to pre-cool the air before it is delivered into the settling chamber 60.

The settling chamber 60 is provided in order to reduce the heat transfer between the heat transfer cavity 48 and the casing 32. The settling chamber 60 is of sufficient axial length to reduce the turbulence of the air passing through it to below an acceptable threshold level. Where the air is drawn into the settling chamber 60 through intermittent slots or holes there will be comparatively large turbulence, at least partially caused by the spreading of the air from the small inlet apertures to the full cross-sectional area of the settling chamber 60. The turbulence of the flow through an upstream portion of the settling chamber 60 means there may be an increase in heat transfer to the casing 32 in this area. At or close to the downstream end of the settling chamber 60, at the front segment carrier 35a, the flow is unidirectional, has more uniform velocity and is substantially low intensity. Thus, the setting chamber 60 provides sufficient axial length for the flow to transition from turbulent to substantially low intensity.

Advantageously the flow which crosses the front segment carrier 35a and passes through the heat transfer cavity 48 adjacent to the casing 32 remains substantially low intensity. Thus the heat transfer to the casing 32, within the segment assembly 33, is reduced. In one example the heat transfer, or heat flux, to the casing 32 between the front and rear segment carriers 35a, 35b was reduced to one-third of the value without the settling chamber 60.

Advantageously the settling chamber 60 also reduces the heat transfer to the front segment carrier 35a and front hook 52, and to the rear segment carrier 35b and rear hook 54, which provides better control of the radial growth of these components. Thus the radial clearance 42 can be controlled with a reduced requirement for cooling air to be supplied to the outside of the casing 32 from the cool air chamber 36. Since the cool air chamber 36 may be supplied with cool air which has been bled from a compressor 14, 15 this reduces the bleed requirement which advantageously improves the specific fuel consumption of the engine 10 because more of the air does useful work through the core of the gas turbine engine 10.

Optionally the heat transfer cavity 48 may also be supplied with air via impingement holes 70 through the plate 50. The impingement holes 70 may be perpendicular to the plate 50. However, it should be noted that this will reintroduce some turbulence into the substantially low intensity flow through the heat transfer cavity 48. Alternatively the impingement holes 70 may be angled so that the air introduced is more smoothly entrained into the flow through the heat transfer cavity 48.

Optionally there may be a delivery hole or pipe 72, or an array of delivery holes or pipes 72, at the downstream end of the plate 50. The delivery hole 72 may be configured or arranged to deliver at least a portion of the air from the heat transfer cavity 48 into the segment cooling cavity 44.

Optionally the clearance control arrangement 26 may include additional features to limit the leakage through the birdmouth seal 58. For example it may include a cavity downstream of the birdmouth seal 58 with an independent air supply in order to reduce the pressure drop across the birdmouth seal 58.

Figure 3:
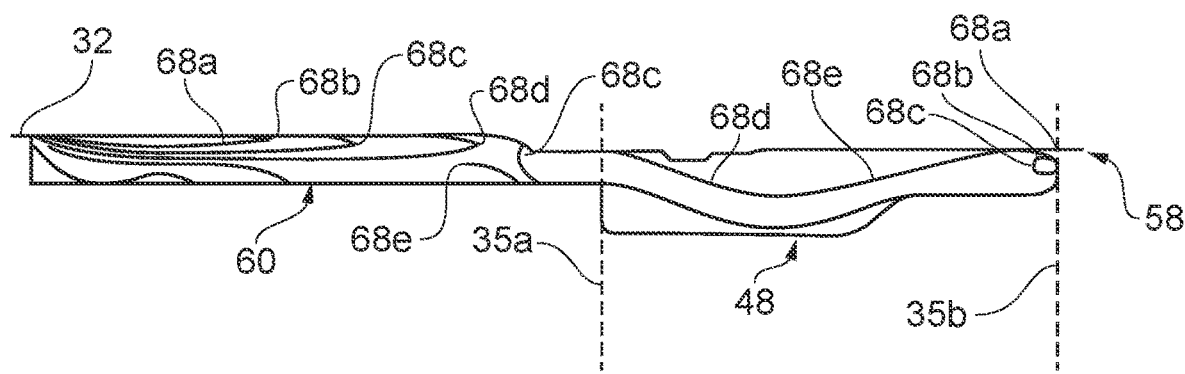
FIG. 3 is a plot showing air flow through the clearance control arrangement.

An exemplary air flow plot is shown in FIG. 3. The settling chamber 60 is shown in outline, as is the heat transfer cavity 48. The positions of the front and rear segment carriers 35a, 35b are indicated by dashed lines while the position of the casing 32 is indicated by a solid line. Contours 68 (suffixes a to e) of velocity magnitude are indicated within the settling chamber 60 and the heat transfer cavity 48, where the suffix a indicates the greatest velocity and the suffix e indicates the lowest velocity.

The axial length $l_{SC}$ of the settling chamber 60 is indicated on FIG. 3 by a double-headed arrow. Similarly the axial distance $d_{FR}$ between the front segment carrier 35a and the rear segment carrier 35b is indicated by a double-headed arrow. The axial length $l_{SC}$ of the settling chamber 60 which is sufficient to produce reasonably low intensity, uniform flow through the segment cooling cavity 44 is dependent on the magnitude and direction of the flow which enters the settling chamber 60. This is partially controlled by the entry features in the upstream wall 64 but is also dependent on upstream components of the gas turbine engine 10 and the operating condition of the engine 10.

In some embodiments the axial length $l_{SC}$ of the settling chamber 60 is greater than or equal to half the axial distance $d_{FR}$ between the carriers. This has been shown to be a minimum axial length $l_{sc}$ to produce sufficient transition to low intensity, uniform velocity flow past the casing 32 in the segment cooling cavity 44.

In some embodiments the axial length $l_{SC}$ of the settling chamber 60 is less than or equal to twice the axial distance $d_{FR}$ between the carriers. This has been shown to be a length which provides good settling of the air flow to uniform velocity without the settling chamber 60 interacting with upstream components of the gas turbine engine 10.

The uniformity of the flow through the heat transfer cavity 48, and particularly adjacent the casing 32, may be disrupted by lips, recesses or protrusions in the surfaces past which it flows. Such features may be related to other components of the engine 10. The presence of such features may mean it is desirable for the settling chamber 60 to have greater axial length $l_{SC}$ in order to compensate for the turbulence reintroduced by the disruptive features. Some features may alternatively reduce the required axial length $l_{SC}$ for the settling chamber 60. As will be apparent to the skilled reader routine design optimisation, which may include visualisation through computational fluid dynamics or similar processes, may be used to select a suitable axial length $l_{SC}$ for the settling chamber 60 in any implementation.

The clearance control arrangement 26 finds particular utility to control the transient thermal response of the rotor 28 and segment assembly 33.

The clearance control arrangement 26 finds particular utility for a rotor in a gas turbine engine 10. Such a gas turbine engine 10 may be used to power an aircraft or a marine vessel. The arrangement 26 may be used on one or more than one rotor stage. For example it may be used for a rotor stage of the high pressure turbine 17, the intermediate pressure turbine 18 or the low pressure turbine 19. It may be used on each of several rotor stages of one of the turbines 17, 18, 19 whether the stages are consecutive or separated by other rotor stages. The arrangement 26 may also be used for rotor stages of the compressors, 14, 15.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A clearance control arrangement for a rotor, the arrangement comprising:
   a rotor;
   a casing radially outside the rotor;
   a segment assembly spaced radially inwards from the casing and defining a radial clearance between the rotor and the segment assembly;
   a front carrier and a rear carrier, the segment assembly supported by the carriers;
   a heat transfer cavity formed between the carriers, the segment assembly and the casing;
   a segment cooling cavity adjacent to the rotor, wherein the heat transfer cavity and the segment cooling cavity are radially separated by a plate; and
   a settling chamber formed adjacent to the casing and upstream of the heat transfer cavity, wherein the clearance control arrangement is configured to receive air into the settling chamber and thence to deliver the air to the heat transfer cavity; wherein
   the settling chamber has an axial length ($l_{sc}$) to reduce turbulence in the air passing through the settling chamber to below a threshold level,
   the segment assembly further includes a front hook and a rear hook, the front hook being configured to support the front carrier and the rear hook being configured to support the rear carrier,
   the front hook has gaps through which the air is axially delivered from the settling chamber to the heat transfer cavity, and
   the plate is disposed entirely radially inward of the front hook.

2. The arrangement as claimed in claim 1 wherein the settling chamber has the axial length ($l_{sc}$) of greater than or equal to half an axial distance ($d_{FR}$) between the front and rear carriers.

3. The arrangement as claimed in claim 2 wherein the rotor is a turbine rotor.

4. The arrangement as claimed in claim 1 wherein the settling chamber has the axial length ($l_{sc}$) of less than or equal to twice an axial distance ($d_{FR}$) between the front and rear carriers.

5. The arrangement as claimed in claim 1 wherein the settling chamber is formed between the front carrier, the casing, an upstream wall and an inner wall.

6. The arrangement as claimed in claim 5 wherein the upstream wall is intermittent in the circumferential direction.

7. The arrangement as claimed in claim 5 wherein the upstream wall includes a slot in the circumferential direction.

8. The arrangement as claimed in claim 7 wherein the slot includes an annular slot.

9. The arrangement as claimed in claim 7 wherein the slot includes an annular array of slots or holes in the circumferential direction.

10. The arrangement as claimed in claim 1 further comprising a birdmouth seal defined at the radially outer extent of the rear carrier.

11. The arrangement as claimed in claim 1 wherein the plate comprises impingement holes.

12. The arrangement as claimed in claim 11 further comprising a delivery hole or pipe arranged to deliver air from the heat transfer cavity into the segment cooling cavity.

13. The arrangement as claimed in claim 1 further comprising a delivery hole or pipe arranged to deliver air from the heat transfer cavity into the segment cooling cavity.

14. The arrangement as claimed in claim 1 wherein the segment assembly includes cooling air delivery holes through its radially inner wall.

15. The arrangement as claimed in claim 1 wherein the rotor is a turbine rotor.

16. A gas turbine engine comprising an arrangement as claimed in claim 1.

* * * * *